United States Patent [19]

Iino et al.

[11] Patent Number: 4,481,175

[45] Date of Patent: Nov. 6, 1984

[54] PROCESS FOR PREPARING APATITE

[75] Inventors: Shinji Iino; Akihiko Nakamura; Kensaku Maruyama; Kohji Nakamura, all of Shimonoseki, Japan

[73] Assignee: Mitsui Toatsu Chemicals, Inc., Tokyo, Japan

[21] Appl. No.: 544,361

[22] Filed: Oct. 21, 1983

[30] Foreign Application Priority Data

Dec. 14, 1982 [JP] Japan .............................. 57-217842
May 23, 1983 [JP] Japan .............................. 58-89288

[51] Int. Cl.$^3$ ............................................. C01B 25/32
[52] U.S. Cl. ..................................... 423/308; 423/309; 423/311
[58] Field of Search ..................... 423/308, 309, 311

[56] References Cited

U.S. PATENT DOCUMENTS 4,265,867  5/1981  Caswell ............................. 423/309
4,324,772  4/1982  Conn et al. ........................ 423/309

Primary Examiner—John Doll
Assistant Examiner—Wayne A. Langel
Attorney, Agent, or Firm—Scully, Scott, Murphy & Presser

[57] ABSTRACT

A calcium-phosphorus apatite is obtained by reacting a calcium compound with a phosphorus compound under reflux in a reaction medium consisting mainly of an organic solvent and water.

15 Claims, No Drawings

PROCESS FOR PREPARING APATITE

BACKGROUND OF THE INVENTION

The present invention relates to a process for preparing apatite and more particularly to a process for preparing a calcium-phosphorus apatite.

Apatite is a general term for a wide range of compounds represented by the general formula $M^{2+}{}_{10}(ZO_4{}^{3-})_6Y_2{}^-$ wherein M is a metal atom such as, for example, Ca, Pb, Ba, Sr, Mg, Ni, Na, K, Fe or Al, $ZO_4$ is an acid radical such as, for example, $PO_4$, $AsO_4$, $VO_4$, $SO_4$, $SiO_4$ or $CO_3$, and Y is an anionic atom (or group) such as, for example, F, OH, Cl, Br, $=O$ or $=CO_3$.

Compounds to be prepared by the process of the present invention are those of the above general formula wherein M is substantially Ca and $ZO_4$ is substantially $PO_4$. Therefore, the term "calcium-phosphorus apatite" is used in the present invention, and this term will be hereinafter referred to simply as "Ap". In the present invention, moreover, Ap wherein Y is substantially OH is referred to as "hydroxyapatite", which will be hereinafter referred to simply as "HAp", and Ap wherein $ZO_4$ and/or Y are partially substituted by $=CO_3$ is referred to as "carbonate-containing hydroxyapatite", which will be hereinafter referred to simply as "COAp".

Ap has recently been attracting special attention as a raw material of bioceramics, and its application to artificial bones and teeth has been studied. Further, as a laser material, a catalyst for the dehydration of alcohols, a fluorescent material, an electronic material, an inorganic ion exchanger, and also as a packing material for chromatography for the purpose of separation of polymeric substances such as proteins, nucleic acids, enzymes and viruses by utilization of a high biocompatibility of Ap, Ap is now considered to be promising.

More particularly, it is a well-known fact as described in many literatures that natural teeth and natural bones are composite materials of about 70% HAp and about 30% organic substances such as collagen. Of great interest is the fact that the HAp as a constituent of natural teeth and natural bones contains several percent of carbonate radicals. And HAp prepared so as to contain several percent of carbonate radicals, namely, COAp, is attracting considerable attention as a raw material of bioceramics. Many advantages are expected by using COAp similar in chemical structure to natural teeth or natural bones as an implant material, for example, an enhanced biocompatibility, a faster acclimation to the natural teeth or natural bones, and a decreased rejection.

As to the manufacturing process for Ap having such advantages, various processes have heretofore been disclosed in literatures, patents, etc., including the following main processes:

(1) Hydrothermal process involving reacting anhydrous calcium hydrogenphosphate with phosphoric acid in an autoclave at 100°–500° C., 1–500 atm. for about 48 hours.

(2) Dry process involving reacting tri-calcium phosphate with calcium oxide at a high temperature of 900°–1300° C. under a stream of steam for about 3 hours.

(3) Wet process involving reacting a water-soluble phosphate with a water-soluble calcium salt in an aqueous solution at 37° C. and at a pH value of 7–8 for at least 20 days to obtain Ap having an approximately stoichiometric ratio.

However, in both the above processes (1) and (2), since the reactions are carried out at high temperatures and high pressures, the synthesis apparatus are inevitably expensive; besides, the operation of the apparatus is complicated and the amount of energy consumed is very large. In the above process (3), even a slight difference in the reaction conditions greatly affects the composition of the resulting product, and such a long period of 20 days, which is inconceivable in an industrial-scale production, is required for obtaining Ap of a stoichiometric composition, thus resulting in that the handling of the materials and the operation of the apparatus become complicated, and the reproducibility of results is not good.

Due to these drawbacks, with the conventional processes it has been very difficult to prepare Ap of good quality quantitatively in practical amounts, and because of this difficulty in the production of Ap, the resulting product becomes very expensive and the use thereof is limited to a great extent although the superior properties of Ap are known.

SUMMARY OF THE INVENTION

It is an object of the present invention to overcome the above-mentioned disadvantages of the conventional processes.

It is another object of the present invention to provide a process for preparing Ap of good quality in large amounts in a simple manner.

The above objects of the present invention are attained by using a reaction medium which contains at least one organic solvent in the preparation of Ap by the reaction of a calcium compound and a phosphorus compound.

According to the process of the present invention, it is possible to obtain an Ap with good reproducibility at a relatively low temperature under atmospheric pressure and that in a short time.

DESCRIPTION OF PREFERRED EMBODIMENTS

In practising the present invention, at least one calcium compound and at least one phosphorus compound are fed beforehand into a reaction vessel in a desired Ca/P atomic ratio and are slurried by the addition of an appropriate amount of water, then at least one organic solvent is added and heating is performed under reflux. A reflux time of about 2 hours suffices. The heat-reflux time and the order of feeding the starting materials containing an organic solvent into a reaction vessel are usually as just mentioned above, but are not always restricted to them.

After the heating, the reaction product contains a slurried precipitate of the resultant Ap, so this slurry may be separated. The slurried precipitate may be separated by only filtration as usually adopted, or by first evaporating water together with the organic solvent and then filtering off Ap. In the latter method, the dehydration is performed while adding the organic solvent in an amount corresponding to the total volume of the evaporated water and the evaporated organic solvent, and after completion of the dehydration, the Ap is separated from the organic solvent by filtration. The latter method is preferable in that the dehydration can be done to a complete extent.

Examples of the calcium compound and the phosphorus compound used as the starting materials in the present invention are $H_3PO_4$, $HPO_3$, $H_4P_2O_7$, $P_2O_5$, $PCl_3$, $PCl_5$, $Ca(H_2PO_4)_2 \cdot H_2O$, $Ca(PO_3)_2$, $CaHPO_4$, $CaHPO_4 \cdot 2H_2O$, $Ca_2P_2O_7$, $Ca_3(PO_4)_2$, $Ca_8H_2(PO_4)_6 \cdot 5H_2O$, $CaO$, $CaCl_2$, $Ca(OH)_2$, $CaCO_3$, $CaF_2$, $Ca(NO_3)_2$ and $Ca(COO)_2$, provided there are merely examples and are not intended to restrict the invention thereto. Preferably, two or more of these compounds are selected and mixed so as to give a calcium/phosphorus (Ca/P) atomic ratio of 1.30 to 1.90. The selection of the starting compounds may be made according to uses and purposes. For example, in case Ap which contains fluorine is to be obtained, there may be used $CaF_2$, and in case Ap which contains chlorine is to be obtained, there may be used $CaCl_2$. It is also possible to obtain HAp or COAp without using these halogen-containing compounds.

For preparing COAp, which has superior characteristics as previously noted, there may be used as starting materials a phosphoric acid and/or a calcium salt thereof and calcium carbonate.

Higher purity of the starting calcium compound and phosphorus compound is preferable because it is easier to obtain product of higher purity. However, it is not that the starting compounds used in the present invention are required to have a specially high purity, but there is a room for selection of starting compounds of a suitable purity according to the purity required of the resulting product. In case the resulting product is to be used as a biomaterial, it is desirable to use starting compounds having low contents of impurities such as Fe, Ni and Zn and heavy metals and other biodetriments. Even starting compounds of the industrial grade are usually employable.

For the reaction in the present invention, the calcium compound and the phosphorus compound are fed in the range of 1.30 to 1.90, preferably 1.45 to 1.75, in terms of Ca/P atomic ratio. This brings about the advantage that the resulting Ap has a good crystallinity and contains little unreacted components. Since the desired atomic ratio (Ca/P) of Ap is theoretically 5/3, the optimum atomic ratio in the reaction of calcium and phosphorus ought to be also 5/3, but in the actual reaction, if the atomic ratio is within the above-mentioned range, there can be obtained any desired Ap. It has also been confirmed that even in case the Ca/P atomic ratio is lower than 1.30 or higher than 1.90, there is obtained Ap which exhibits a satisfactory performance in some uses, for example, for water treatment or as an ion exchanger.

It is essential in the present invention to use a reaction medium which contains an organic solvent. Any organic solvent may be used, provided it can form two phases with water or is compatible with water and can form a homogeneous phase. If the organic solvent has a boiling point not lower than 30° C. under atmospheric pressure, it is very convenient. If the boiling point of the organic solvent used is lower than 30° C., a longer time will be required for the reaction of the calcium compound and the phosphorus compound, that is, the feature of the present invention that the reaction can be completed in a relatively short time is lost.

The criterion for judging the suitability of the organic solent to be used can differ according to the selection of variable of state, but generally the following compounds may be mentioned as suitable examples of the organic solvent used in the present invention: aromatic and aliphatic hydrocarbons such as benzene, toluene, xylene, pentane, heptane, octane, decane, various petroleum naphthas and industrial gasoline; alcohols such as n-propyl alcohol, iso-propyl alcohol, iso-butyl alcohol, tert-butyl alcohol, n-amyl alcohol, ethylene glycol, diethylene glycol and triethylene glycol; ethers such as diethyl ether, ethyl butyl ether, cellosolves such as methyl cellosolve and butyl cellosolve, and carbitols such as methyl carbitol and diethyl carbitol; ketones such as methyl ethyl ketone, methyl isobutyl ketone, diacetone alcohol and acetylacetone; amines such as triethylamine, tributylamine and pyridine; esters such as methyl cellosolve acetate, methyl carbitol acetate and carbitol acetate; organic acids such as acetic, propionic, butyric and lactic acids; as well as aprotic solvents such as dimethylformamide, acetonitrile and dimethyl sulfoxide. These are merely examples of the organic solvent employable in the present invention and are not intended to limit the invention thereto.

A suitable amount of the organic solvent used differs according to the kind of the organic solvent used, the kind of the calcium compound and that of the phosphorus compound both fed to the reaction, stirring conditions in the reaction, etc., but under any conditions it is preferable that the organic solvent be added to an amount not larger than 50% as the slurry concentration. Usually, it is preferable to use the organic solvent in an amount one to ten times the weight of the starting compounds. The amount of water used is not specially limited, either. Water may be used, for example, in an amount 0.2 to 1 time the weight of the starting compounds.

Since the reaction is carried out usually under reflux, the reaction temperature differs according to the solvent used, but preferably it is in the range of 30° to 200° C.

As previously noted, the conventional Ap manufacturing processes require a high temperature, a high pressure, a long reaction time and adjustment to optimum pH value, and consequently involve a large volume of energy consumption and require a complicated operation and an expensive apparatus. On the other hand, the process of the present invention involves only reaction at a low temperature in the presence of the organic solvent and subsequent filtration and drying of the resultant crystals; consequently, the amount of heat energy consumed is very small and there may be used a less expensive manufacturing apparatus of a simpler construction, which may be made of glass or stainless steel.

According to the process of the present invention, as set forth hereinabove, Ap, whose production in a simple manner has heretofore been difficult, can be produced quantitatively and less expensively with good reproducibility. Thus, the present invention has a great industrial value.

Working examples of the present invention will be given below to further illustrate the invention, but it is to be understood that the invention is not limited thereto as long as the gist thereof is not altered.

EXAMPLE 1

103.20 g. of calcium hydrogenphosphate dihydrate (dicalcium phosphate dihydrate), 28.12 g. of calcium hydroxide, 60 g. of water and 400 g. of n-pentane were fed into a 1 l flask and the temperature was raised under stirring. After heating at a temperature not higher than the reflux temperature (35° C.) for about 2 hours, the water and n-pentane in the reaction system were evaporated while adding into the system n-pentane in an amount corresponding to the total volume of the evaporated n-pentane and water. As the dehydration proceeded, the internal temperature rose, and when the internal temperature exceeded 36° C., the heating was discontinued. After subsequently cooling, the product (precipitate) was separated from the solvent by filtration and then dried to obtain a white powder. This powder proved to have an X-ray diffraction pattern exhibiting main peaks at diffraction angles of $2\theta = 31.7$, 32.2 and 32.8, which coincide with the characteristic diffraction peaks of HAp described in ASTM card 9-432.

EXAMPLES 2–8

Calcium hydrogenphosphate dihydrate, anhydrous calcium hydrogenphosphate, anhydrous tricalcium phosphate, calcium carbonate, calcium hydroxide, water and organic solvents were fed under the conditions described in Table 1. The other conditions than those shown in Table 1 were the same as in Example 1. As will be seen from the results described in the same table, there were obtained Ap's quantitatively at relatively low temperatures below 200° C. and that in a short time according to the process of the present invention.

The "Solvesso #150" described in Table 1 is an aromatic solvent manufactured by Esso Standard Sekiyu K.K.

(precipitate) was separated from the solvent by filtration and then dried to obtain a white powder. This powder proved to have an X-ray diffraction pattern exhibiting main peaks at diffraction angles of $2\theta = 31.7$, 32.2 and 32.8, which coincide with the characteristic diffraction peaks of HAp described in ASTM card 9-432.

EXAMPLES 10–12

Calcium hydrogenphosphate dihydrate, anhydrous calcium hydrogenphosphate, calcium carbonate, calcium hydroxide, water and organic solvents were fed under the conditions described in Table 2. The other conditions than those shown in Table 2 were the same as in Example 9. As will be seen from the results described in the same table, there were obtained Ap's quantitatively at relatively low temperatures below 200° C. and that in a short time according to the process of the present invention.

TABLE 2

|  | Example | | | |
|---|---|---|---|---|
|  | 9 | 10 | 11 | 12 |
| Blending Ratio (g) | | | | |
| $Ca(H_2PO_4)_2 \cdot H_2O$ | — | 75.6 | — | — |
| $CaHPO_4 \cdot 2H_2O$ | 103.2 | — | — | 103.2 |
| $CaHPO_4$ | — | — | 81.6 | — |
| $Ca(OH)_2$ | 28.1 | — | 28.1 | — |
| $CaCO_3$ | — | 38.0 | — | 38.0 |
| $H_2O$ | 120 | 120 | 120 | 120 |

TABLE 1

|  | Example | | | | | | | |
|---|---|---|---|---|---|---|---|---|
|  | 1 | 2 | 3 | 4 | 5 | 6 | 7 | 8 |
| Blending Ratio (g) | | | | | | | | |
| $CaHPO_4 \cdot 2H_2O$ | 103.20 | — | 103.20 | — | 103.20 | — | — | — |
| $CaHPO_4$ | — | 81.60 | — | — | — | 81.60 | 81.60 | — |
| $Ca_3(PO_4)_2$ | — | — | — | 93.00 | — | — | — | 93.00 |
| $CaCO_3$ | — | 38.0 | — | 9.50 | — | 38.0 | — | — |
| $Ca(OH)_2$ | 28.12 | — | 28.12 | — | 28.12 | — | 28.12 | 7.03 |
| $H_2O$ | 60 | 60 | 60 | 60 | 60 | 60 | 60 | 60 |
| n-Pentane | 400 | — | — | — | — | — | — | — |
| n-Hexane | — | 350 | — | — | — | — | — | — |
| Benzene | — | — | 350 | — | — | — | — | — |
| iso-Butanol | — | — | — | 400 | — | — | — | — |
| Methyl isobutyl ketone | — | — | — | — | 400 | — | — | — |
| Xylene | — | — | — | — | — | 400 | — | — |
| Mineral spirit | — | — | — | — | — | — | 400 | — |
| Solvesso #150 | — | — | — | — | — | — | — | 400 |
| Reflux Temperature (°C.) | 35 | 63 | 93 | 91 | 90 | 97 | 101 | 104 |
| Dehydration End Temperature (°C.) | 36 | 69 | 80 | 104 | 115 | 140 | 167 | 192 |
| Yield (g) | 110 | 121 | 113 | 118 | 112 | 120 | 110 | 112 |

EXAMPLE 9

103.20 g. of calcium hydrogenphosphate dihydrate (dicalcium phosphate dihydrate), 28.12 g. of calcium hydroxide, 120 g. of water and 400 g. of tert-butanol were fed into a 1 l flask and the temperature was raised under stirring. After heating at a temperature not higher than the reflux temperature (81° C.) for about 2 hours, the water and tert-butanol in the reaction system were evaporated while adding into the system tert-butanol in an amount corresponding to the total volume of the evaporated tert-butanol and water. As the dehydration proceeded, the internal temperature rose, and when the internal temperature exceeded 83° C., the heating was discontinued. After subsequent cooling, the product

| tert-BuOH | 400 | — | — | — |
| Pyridine | — | 400 | — | — |
| Acetylacetone | — | — | 400 | — |
| Butyl cellosolve | — | — | — | 400 |
| Reflux Temperature (°C.) | 81 | 97 | 99 | 104 |
| Dehydration End Temperature (°C.) | 83 | 114 | 140 | 173 |
| Yield (g) | 110 | 118 | 115 | 118 |

EXAMPLE 13

103.20 g. of calcium hydrogenphosphate dihydrate (dicalcium phosphate dihydrate), 38.0 g. of calcium carbonate, 60 g. of water and 400 g. of n-pentane were fed into a 1 l flask and the temperature was raised under stirring. After heating at a temperature not higher than the reflux temperature (35° C.) for about 2 hours, the water and n-pentane in the reaction system were evaporated while adding into the system n-pentane in an amount corresponding to the total volume of the evaporated n-pentane and water. As the dehydration proceeded, the internal temperature rose, and when the internal temperature exceeded 36° C., the heating was discontinued. After subsequent cooling, the product (precipitate) was separated from the solvent by filtration and then dried to obtain a white powder. The powder proved to have an X-ray diffraction pattern exhibiting main peaks at diffraction angles of $2\theta = 31.7$, 32.2 and 32.8, which coincide with the characteristic diffraction peaks of HAp described in ASTM card 9-432.

Further, infrared absorption spectrum of this powder includes in the vicinity of 1400 cm$^{-1}$ several split absorption bands peculiar to carbonate radical contained in HAp, from which the above-prepared HAp proved to contain carbonate radical.

EXAMPLES 14–16

Anhydrous dicalcium phosphate, monocalcium phosphate monohydrate, anhydrous tricalcium phosphate, calcium carbonate, water and organic solvents were fed under the conditions shown in Table 3. The other conditions than those shown in Table 3 were the same as in Example 13. As will be seen from the results set out in the same table, which refers also to Example 13, there were obtained COAp's quantitatively at relatively low temperatures below 200° C. and that in a short time while controlling the content of carbonate radical according to the process of the present invention.

TABLE 3

|  | Example | | | |
|---|---|---|---|---|
|  | 13 | 14 | 15 | 16 |
| Blending Ratio (g) | | | | |
| CaHPO$_4$.2H$_2$O | 103.2 | — | — | — |
| CaHPO$_4$ | — | 81.60 | — | — |
| Ca$_3$(PO$_4$)$_2$ | — | — | 93.0 | — |
| Ca(H$_2$PO$_4$)$_2$.H$_2$O | — | — | — | 75.6 |
| CaCO$_3$ | 38.0 | 38.0 | 9.5 | 67.5 |
| H$_2$O | 60 | 60 | 60 | 60 |
| n-Pentane | 400 | — | — | — |
| Methyl iso-butyl ketone | — | 400 | — | — |
| Xylene | — | — | 400 | — |
| Butyl cellosolve | — | — | — | 400 |
| Reflux Temperature (°C.) | 35 | 88 | 97 | 104 |
| Dehydration End Temp. (°C.) | 36 | 117 | 139 | 174 |
| Yield (g) | 122 | 120 | 99 | 122 |
| Chemical Analysis | | | | |
| CaO (%) | 52.9 | 52.5 | 55.7 | 52.0 |
| P$_2$O$_5$ (%) | 40.2 | 40.0 | 42.4 | 39.6 |
| CO$_2$ (%) | 4.50 | 4.90 | 1.00 | 6.00 |

An experiment was conducted for proving the presence of carbonate radical by measurement of lattice constants. Table 4 shows results of chemical analysis and measurement of lattice constants before and after calcining of COAp prepared according to Example 13.

The determination of carbonate radical was conducted according to the carbonic anhydride determination method defined in the phosphorus ore analyzing method (established by Technical Expert Committee, Japan Chemical Fertilizer Association) for its content above 2% and by using Conway's microdiffusion analyzer for its content below 2%.

TABLE 4

|  | CaO (%) | P$_2$O$_5$ (%) | CO$_2$ (%) | Lattice Constant | |
|---|---|---|---|---|---|
|  |  |  |  | a axis | c axis |
| Example 13, before calcining | 52.9 | 40.2 | 4.50 | 9,446 | 6,890 |
| Example 13, after calcining* | 56.1 | 42.6 | 0.05 | 9,416 | 6,881 |
| ASTM 9-432 | — | — | — | 9,418 | 6,884 |

*calcined in air at 1300° C. for 1 hour

From Table 4 it is seen that the COAp obtained according to Example 13 contains about 4% of carbonate radicals before calcining. The content of carbonate radicals after calcining is lowered by scattering of carbonate radicals with growth of COAp crystals. This fact is recognized also in lattice constants obtained by powder X-ray diffraction. It is presumed that, before calcining, the carbonate radicals are confined in the lattices of the COAp, thus causing lattice asymmetry and resulting in larger lattice constants than those of ASTM 9-432 in both "a" and "c" axes, and that, after calcining, about the same values of lattice constants as those of ASTM 9-432 are caused by scattering of carbonate radicals from the lattices and the resulting elimination of the lattice asymmetry.

What is claimed is:

1. In the process for preparing a calcium-phosphorus apatite by reacting at least one calcium compound with at least one phosphorus compound, the improvement characterized in that the calcium-phosphorus atomic ratio of said calcium compound and said phosphorus compound is from about 1.30 to about 1.90, and said reaction is carried out in a reaction medium which contains at least one organic solvent said reaction being conducted for a sufficient length of time so as to form said apatite.

2. The process of claim 1 wherein said reaction medium consists mainly of said organic solvent and water.

3. The process of claim 1 wherein said organic solvent is capable of forming two phases with water.

4. The process of claim 1 wherein said organic solvent is capable of forming a homogeneous phase by being mixed with water.

5. The process of claim 1 wherein said calcium compound and said phosphorus compound are used in the range of 1.45 to 1.75 in terms of Ca/P atomic ratio.

6. The process of claim 1 wherein the starting compounds are at least two compounds selected so as to give a Ca/P atomic ratio of 1.30 to 1.90 from the group consisting of phosphoric acids, phosphates, calcium oxide, calcium hydroxide and calcium salts.

7. The process of claim 1 wherein a phosphoric acid and/or a calcium salt thereof and calcium carbonate are used as the starting compounds to obtain a calcium-phosphorus apatite having carbonate radical.

8. The process of claim 1 wherein the reaction is carried out at a temperature in the range of 30° to 200° C.

9. The process of claim 1 wherein said organic solvent has a boiling point not lower than 30° C.

10. The process of claim 9 wherein said organic solvent is at least one compound selected from the group consisting of hydrocarbons, alcohols, ethers, ketones, organic amines, esters, organic acids and aprotic solvents.

11. The process of claim 1, in which at least one calcium compound and at least one phosphorus compound are reacted by forming a mixture of such compounds in water with an organic solvent, heating said mixture under reflux conditions to form a slurry of calcium-phosphorus apatite, water and solvent and then separating said calcium-phosphorus apatite from said slurry.

12. The process of claim 11, wherein said calcium compound and said phosphorus compound are first added together in water after which said organic solvent is added thereto to form said mixture.

13. The process of claim 11, where said calcium-phosphorus apatite is separated from said slurry subsequent to a dehydration process comprising evaporating said water and said organic solvent from said slurry and adding organic solvent to said slurry during said evaporation, the added solvent corresponding to the total volume of said water and said organic solvent that are evaporated in said dehydration process followed by separating said calcium-phosphorus apatite therefrom.

14. The process of claim 11, where the calcium-phorphorus atomic ratio is from about 1.45 to about 1.75.

15. The process of claim 11, wherein said organic solvent has a boiling point not lower that 30° C.

* * * * *